United States Patent
Olson et al.

(10) Patent No.: US 12,530,062 B2
(45) Date of Patent: Jan. 20, 2026

(54) PROVIDING OPTIMIZED HOUSING AND SERVICEABILITY OF REMOVABLE COMPUTER SYSTEM COMPONENTS

(71) Applicant: INTERNATIONAL BUSINESS MACHINES CORPORATION, Armonk, NY (US)

(72) Inventors: David Charles Olson, Lagrangeville, NY (US); Michael F. Scanlon, Poughkeepsie, NY (US); Robert R. Genest, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 18/193,687

(22) Filed: Mar. 31, 2023

(65) Prior Publication Data

US 2024/0329700 A1    Oct. 3, 2024

(51) Int. Cl.
*G06F 1/18* (2006.01)

(52) U.S. Cl.
CPC .................... *G06F 1/186* (2013.01)

(58) Field of Classification Search
CPC ........ G06F 1/185; G06F 1/186; H05K 7/1405
See application file for complete search history.

(56) References Cited

U.S. PATENT DOCUMENTS

| | | | | |
|---|---|---|---|---|
| 5,734,551 A | * | 3/1998 | Hileman | G06F 1/185 361/801 |
| 6,220,887 B1 | * | 4/2001 | Downs | H01R 12/7005 361/801 |
| 7,116,241 B2 | | 10/2006 | Post et al. | |
| 8,348,696 B2 | * | 1/2013 | Tan | H01R 13/7172 439/490 |
| 9,060,453 B2 | * | 6/2015 | Cox | H01R 13/62955 |

(Continued)

FOREIGN PATENT DOCUMENTS

EP    0629111 B1    2/1998

OTHER PUBLICATIONS

Molex, Application Tooling Specification Sheet, DDR3 Dimm Light Pipe Extraction Tool, Order No. 62100-9250, Doc No. ATS-621009250, Revision: A, Uncontrolled Copy, URL: https://www.electronicsdatasheets.com/download/579b5536e34e243a70581ace.pdf?format=pdf&part=Molex+-+621009250 , Release Date: Nov. 26, 2012, Revision Date: Nov. 26, 2012, 3 pages.

*Primary Examiner* — James Wu
(74) *Attorney, Agent, or Firm* — Onyx IP Group

(57) ABSTRACT

Providing optimized housing and serviceability of removable computer system components. In an embodiment a computing system includes a chassis, the chassis including a bay having a hinged cover; a primary circuit board secured to the chassis, the primary circuit board including a plurality of expansion slots accessible through the bay of the chassis; a plurality of expansion components removably coupled to the primary circuit board via the plurality of expansion slots, wherein each expansion component includes: an expansion card configured for mating with one of the expansion slots; and a carrier removably attached to the expansion card such the carrier provides a grip for inserting and extracting the expansion card; and a plurality of component guides within the bay, wherein each component guide is configured to guide mating of each expansion card with a corresponding expansion slot.

20 Claims, 16 Drawing Sheets

(56) References Cited

U.S. PATENT DOCUMENTS

| | | |
|---|---|---|
| 9,626,844 B2 | 4/2017 | Kelaher et al. |
| 9,779,006 B2 | 10/2017 | Davis et al. |
| 9,839,140 B2 | 12/2017 | Cox et al. |
| 9,886,200 B2 | 2/2018 | Vidyapoornachary et al. |
| 11,297,728 B1 | 4/2022 | Shang et al. |

* cited by examiner

PROVIDING OPTIMIZED HOUSING AND SERVICEABILITY OF REMOVABLE COMPUTER SYSTEM COMPONENTS

BACKGROUND

Field of the Disclosure

The field of the disclosure is the serviceability of computing systems, or, more specifically, methods, apparatus, and products for providing optimized housing and serviceability of removable computer system components.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computing systems are designed to increase memory capacity and performance, those systems may require a larger number of removable modules to be installed. One example of a removable module that is commonly installed is a memory module, such as a dual inline memory module (DIMM). As the density of removable modules increases, it becomes more difficult to service and replace those modules.

SUMMARY

Embodiments of the present disclosure are directed to apparatuses, systems, and methods for providing optimized housing and serviceability of removable computer system components. In a particular embodiment, a computing system includes a chassis, the chassis including a bay having a hinged cover; a primary circuit board secured to the chassis, the primary circuit board including a plurality of expansion slots accessible through the bay of the chassis; a plurality of expansion components removably coupled to the primary circuit board via the plurality of expansion slots, wherein each expansion component includes: an expansion card configured for mating with one of the expansion slots; and a carrier removably attached to the expansion card such the carrier provides a grip for inserting and extracting the expansion card; and a plurality of component guides within the bay, wherein each component guide is configured to guide mating of each expansion card with a corresponding expansion slot.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
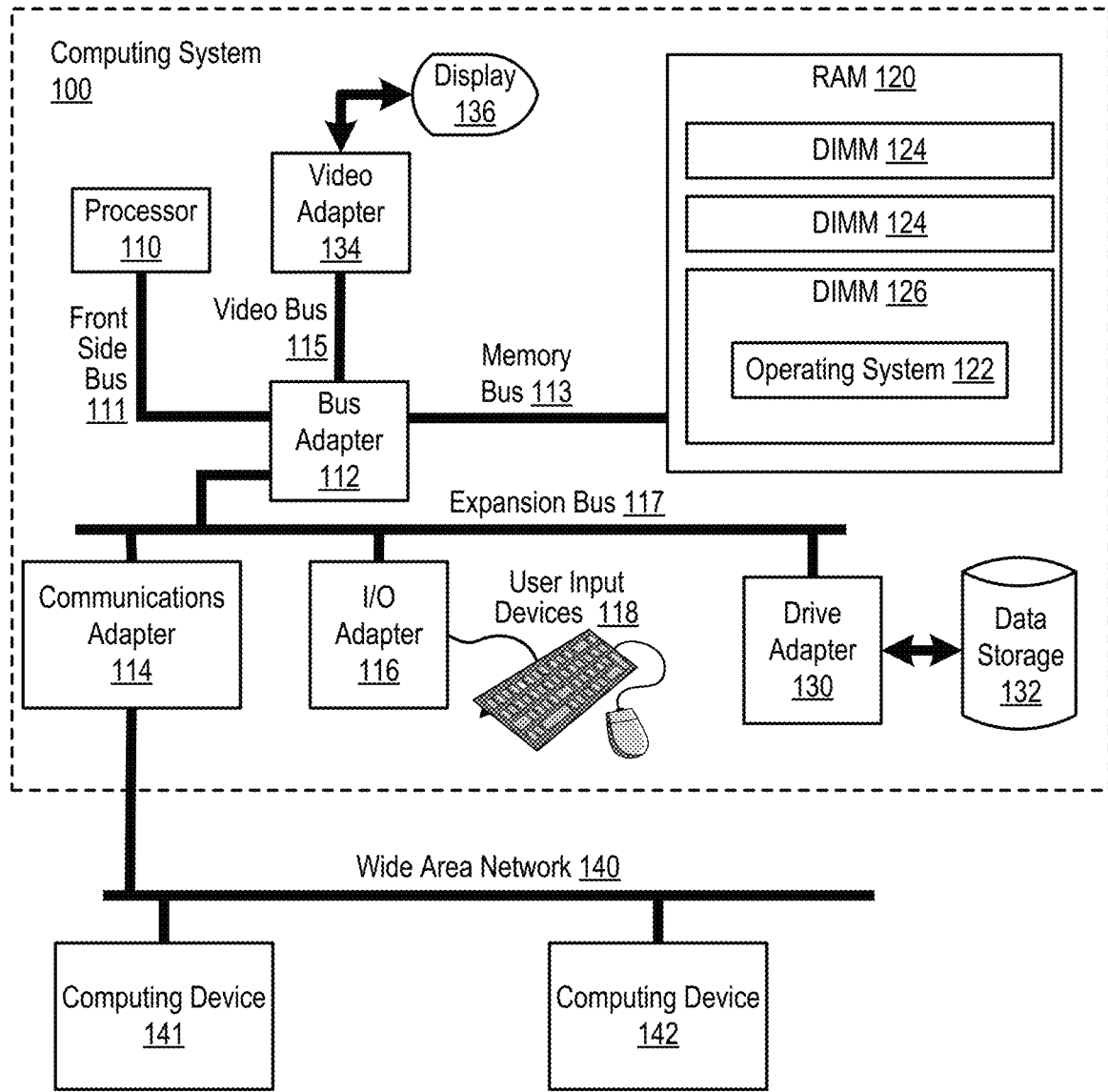
FIG. 1 a block diagram of an example computing system configured for providing optimized housing and serviceability of removable computer system components in accordance with embodiments of the present disclosure.

An embodiment is directed to a computing device configured for providing optimized housing and serviceability of removable computer system components. The computing device includes a chassis including a bay having a hinged cover. The computing device also includes a primary circuit board secured to the chassis, the primary circuit board including a plurality of expansion slots accessible through the bay of the chassis. The computing device also includes a plurality of expansion components removably coupled to the primary circuit board via the plurality of expansion slots, where each expansion component includes: an expansion card configured for mating with one of the expansion slots; and a carrier removably attached to the expansion card such the carrier provides a grip for inserting and extracting the expansion card. The computing device also includes a plurality of component guides within the bay, where each component guide is configured to guide mating of each expansion card with a corresponding expansion slot. In some examples, the expansion card includes a dual inline memory module (DIMM) and the plurality of expansion slots includes a pitch of 11 millimeters or less.

In some examples, the hinged cover includes one or more deformable retention elements that apply a force to the plurality of expansion components when the hinged cover is closed. In some variations, the hinged cover includes a first label area on an exterior surface of the hinged cover, the first label area including a transparent portion to which a double-sided label is attached, where a first side of the double-sided label displays first connection information viewable when the hinged cover is closed, and where a second side of the double-sided label displays second connection information viewable through the transparent portion when the hinged cover is open. The first connection information may include location code information for one or more primary circuit board components. The second connection information may include at least one of location code information and plug order for each expansion card. In some examples, the hinged cover includes a second label on the exterior surface of the hinged cover, the second label including at least one of location code information and plug order for each expansion card.

In some examples, the carrier includes a bottom portion and a top portion, where the expansion card is seated in the bottom portion and the top portion is snapped to the bottom portion. In some variations, the expansion card includes one or more grasp points, and where the expansion card is seated in a pocket of the bottom portion that conforms to a shape of the one or more grasp points. In some examples, the top portion is snapped to the bottom portion by sliding the top portion over the bottom portion. In some variations, a first type of carrier is attached to at least one single height expansion card, where a second type of carrier is attached to at least one double height expansion card, and where the first type of carrier compensates for the height of the at least one single height expansion card such that all of the expansion components are of equal height.

In some examples, each removable expansion component is swappable, such that, after removal of a first expansion component from a first expansion slot, a first carrier of the first expansion component is removable from a first expansion card and attachable to a second expansion card prior to insertion of the second expansion card into the first expansion slot. In some examples, each component guide includes a light pipe that conveys light from an indicator lamp on the primary circuit board.

Another embodiment is directed to an expansion card carrier for providing optimized housing and serviceability of removable computer system components. The carrier includes a bottom portion including a pocket for receiving an end of an expansion card. The carrier also includes a top portion configured to snap fit to the bottom portion, where the top portion is snapped to the bottom portion by sliding the top portion over the bottom portion. In some examples, the end of the expansion card includes one or more grasp points, and where the pocket of the bottom portion conforms to a shape of the one or more grasp points. In some examples, the expansion card has a height that is shorter than a form factor height, and where the carrier compensates the height of the expansion card.

Another embodiment is directed to a method of providing optimized housing and serviceability of removable computer system components. The method includes assembling one or more expansion components, each expansion component including a carrier and an expansion card. The method also includes mating the one or more expansion components with one or more corresponding expansion slots of a primary circuit board within a bay of a computing device chassis. The method also includes closing a hinged cover of the bay such that the hinged cover prevents movement of the one or more expansion components. The method also includes affixing a double-sided label to a transparent portion of the hinged cover, where a first side of the double-sided label displays first connection information viewable when the hinged cover is closed, and where a second side of the double-sided label displays second connection information viewable through the transparent portion when the hinged cover is open.

In some examples, assembling one or more expansion components, each expansion component including a carrier and an expansion card includes seating the expansion card in a pocket of a bottom portion of the carrier and sliding a top portion of the carrier over the bottom portion of the carrier such that a button of the bottom portion snaps into an aperture of the top portion.

In some examples, the method also includes removing a first expansion component including a first carrier and a first expansion card, removing the first carrier from the first expansion card, attaching the first carrier to a second expansion card, and reinstalling the first expansion component including the first carrier and the second expansion card.

Exemplary apparatus and systems for providing optimized housing and serviceability of removable computer system components in accordance with the present disclosure are described with reference to the accompanying drawings, beginning with FIG. 1. FIG. 1 sets forth a block diagram of automated computing machinery comprising an exemplary computing system 100 configured for providing optimized housing and serviceability of removable computer system components according to embodiments of the present disclosure. The computing system 100 of FIG. 1 includes at least one computer processor 110 or 'CPU' as well as random access memory ('RAM') 120 which is connected through a high speed memory bus 113 and bus adapter 112 to processor 110 and to other components of the computing system 100.

Stored in RAM 120 is an operating system 122. Operating systems useful in computers configured for providing optimized housing and serviceability of removable computer system components according to embodiments of the present disclosure include UNIX™, Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. In some examples, RAM 120 is embodied in one or more memory modules such as dual inline memory modules (DIMMs) 124, 126, 128. In some examples, the memory modules are removable modules configured for providing optimized housing and serviceability of removable computer system components in accordance with some embodiments of the present disclosure.

The computing system 100 of FIG. 1 includes disk drive adapter 130 coupled through expansion bus 117 and bus adapter 112 to processor 110 and other components of the computing system 100. Disk drive adapter 130 connects non-volatile data storage to the computing system 100 in the form of data storage 132. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 802.3) adapters for wired data communications, and 802.11 adapters for wireless data communications. The communications adapter 114 of FIG. 1 is communicatively coupled to a wide area network 140 that also includes other computing devices, such as computing devices 141 and 142 as shown in FIG. 1.

Figure 2:
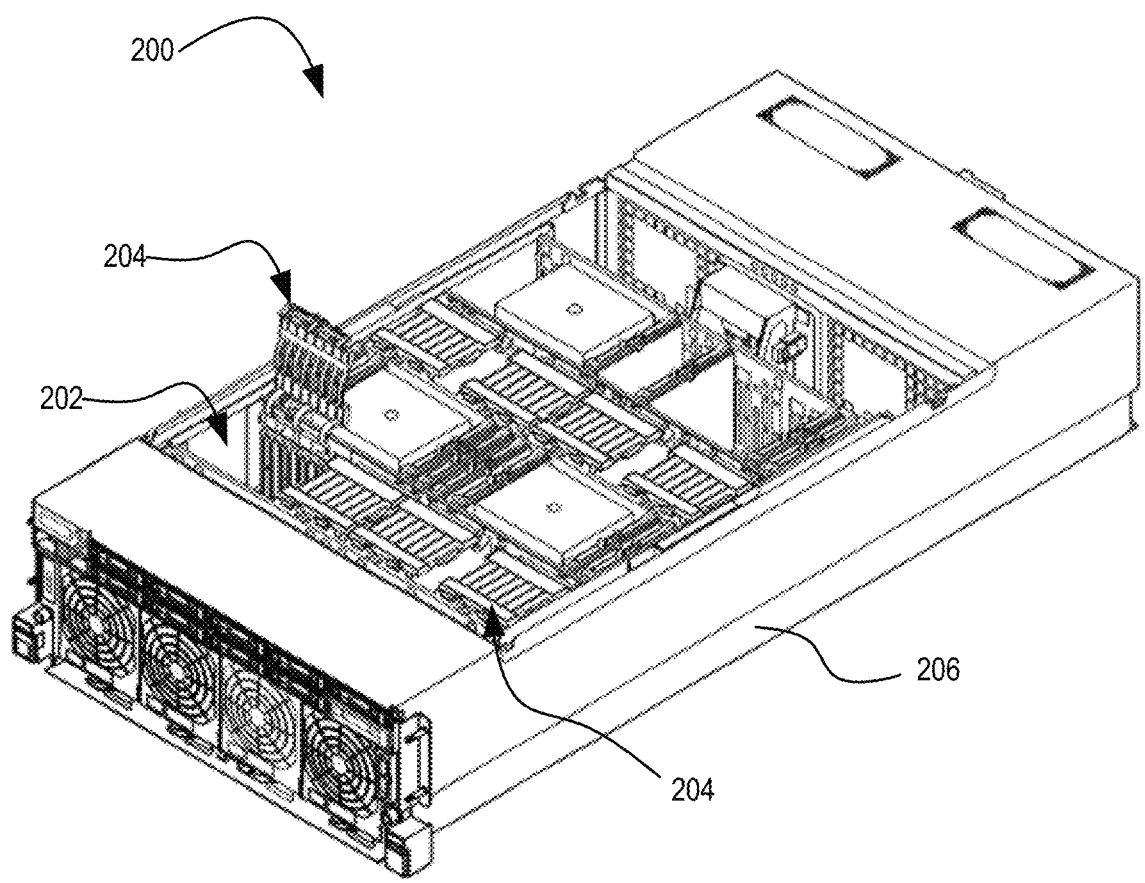
FIG. 2 shows a line drawing of an example computing system configured for providing optimized housing and serviceability of removable computer system components in accordance with embodiments of the present disclosure.

For further explanation, FIG. 2 sets forth a line drawing of an example computing device 200 for providing optimized housing and serviceability of removable computer system components according to embodiments of the present disclosure. The computing device 200 may be, for example, a server. In some examples, the computing device 200 includes a chassis 206 defining one or more bays 202 for receiving removable expansion components. Examples of expansion components include memory modules, network adapters, graphics coprocessors, and so on. In a particular example, an expansion component includes a dual inline memory module (DIMM). Each bay 202 includes a hinged retainer 204 to secure the removable expansion components. The hinged retainer 204 opens to allow insertion and extraction of the expansion component, and snaps closed to secure the installed expansion components. In FIG. 2, hinged retainers 204 are shown in both the open and closed positions. Examples of the hinged retainers 204 will be described in more detail below.

Figure 3:
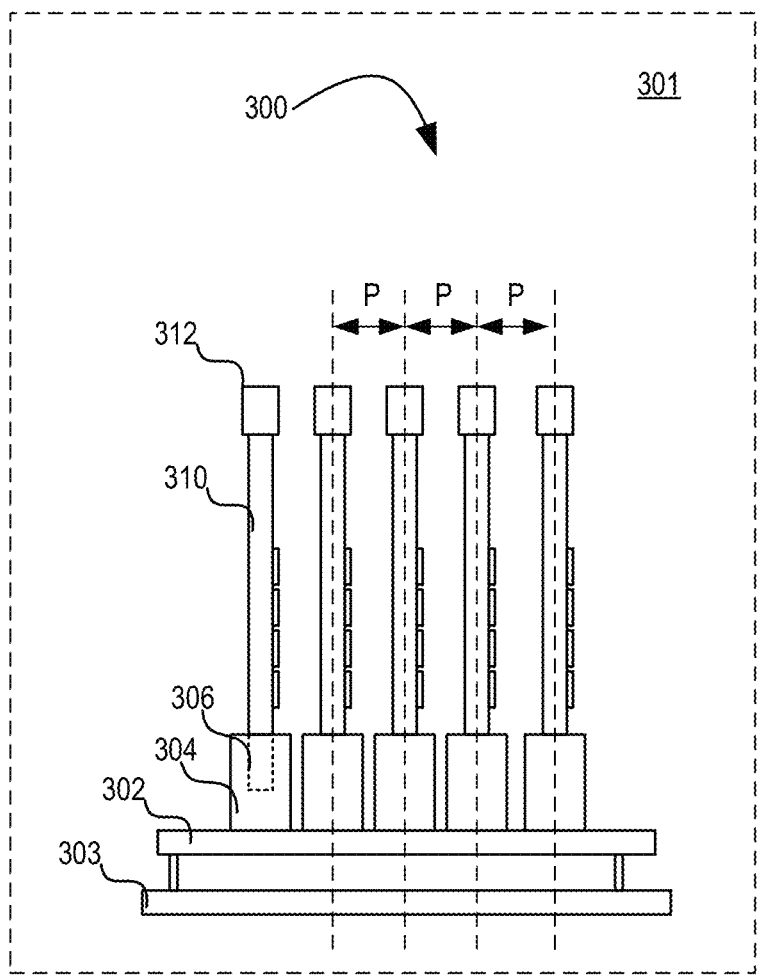
FIG. 3 is a block diagram of an example connection interface of computing system configured for providing optimized housing and serviceability of removable computer system components in accordance with embodiments of the present disclosure for providing optimized housing and serviceability of removable computer system components according to some embodiments of the present disclosure.

For further explanation, FIG. 3 sets forth a sectional view of an example connection interface 300 of a computing device 301 for providing optimized housing and serviceability of removable computer system components according to embodiments of the present disclosure. The connection interface 300 of FIG. 3 includes a primary circuit board 302, which may be fixed or otherwise coupled to the chassis 303 of the computing device 301 (e.g., the computing device 200 of FIG. 2). The primary circuit board 302 may also be referred to as a motherboard or main planar. The primary circuit board 302 is configured to interface with expansion components such as expansion cards 310 through expansion slots, sockets, or plugs. The expansion cards 310 may be circuit boards that provide additional functionality (e.g., memory, compute capability, adapters) to the primary circuit board 302. The connection interface 300 facilitates easy insertion and removal of expansion cards to add additional expansion cards to increase functionality or to service expansion cards. In this sense, the expansion cards are swappable. In a particular example, the expansion cards 310 are DIMMs that provide memory capacity for one or more processors on the primary circuit board 302. The primary circuit board 302 includes multiple slots 304 into which the connectors 306 of the expansion cards 310 are inserted, thus establishing the interface between the primary circuit board 302 and the expansion cards 310. For installation, the expansion cards 310 are simply pushed into the slots 304 without need for a tool. Removal of the expansion cards 310 is accomplished by sampling pulling the expansion card 310 out of the slot 304 without need for a tool.

In some examples, expansion cards 310 have standard dimensions. For example, an expansion card 310 may be a single height (or '2U') or a double height (or '4U'). In some examples, the computing device may include a mixture of 2U and 4U expansion cards installed. In some cases, an expansion card 310 includes only a 2.8 millimeter keep out along the sides of the card and a 0.5 millimeter keep out along the top of the card, where the keep out portions are the portions of the cards that do not contain electronic components and are therefore safe to touch. In some computing systems, the pitch P of the expansion cards 310 is 11 millimeters or less. At such a pitch and with such small keep outs, it may be difficult for a technician to safely grasp an expansion card 310 for extraction without damaging the expansion card or neighboring expansion cards. Accordingly, in accordance with the present disclosure, an expansion card 310 is fitted with a carrier 312 to aid insertion and extraction of the expansion card 310. In some examples, the computing device 301 is provided with expansion components preinstalled, each expansion component including an expansion card and a carrier attached to the expansion card.

Figure 4:
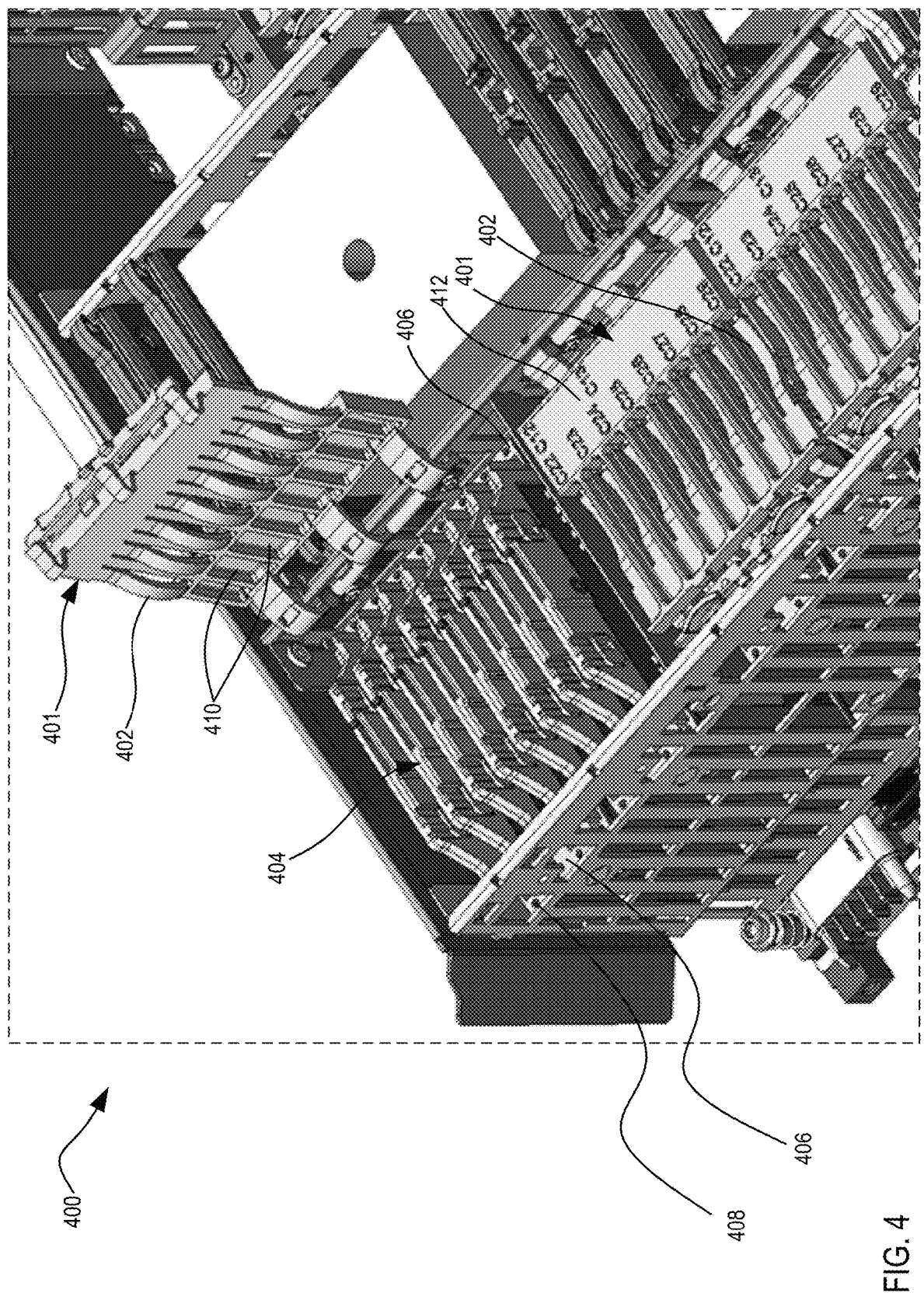
FIG. 4 is an illustration of a computing system configured for providing optimized housing and serviceability of removable computer system components in accordance with embodiments of the present disclosure for providing optimized housing and serviceability of removable computer system components according to some embodiments of the present disclosure.

For further explanation, FIG. 4 illustrates a portion of an example computing device 400 for providing optimized housing and serviceability of removable computer system components according to embodiments of the present disclosure. For example, the example computing device 400 may be similar to the computing device 200 in FIG. 2. In FIG. 4, multiple arrayed expansion components 404 are installed in the computing device 400. Insertion and extraction of each expansion component is facilitated by guides 406 installed on walls of the chassis within the expansion component bay. In some examples, the guides 406 include a light pipe 408 that conveys light from an indicator light on the primary circuit board. The chassis may include windows proximate to the guides 406 for viewing light emitted through the light pipes 408.

In some examples, a bay includes a cover that is a hinged retainer 401 (e.g., like the hinged retainer 204 in FIG. 2). In some examples, the hinged retainer 401 includes a spring element 402 corresponding to each expansion slot. Once installed in expansion slots, the expansion components 404 are secured by the spring elements 402 when the hinged retainer 401 is snapped closed. That is, when the hinged retainer 401 is closed, a force is applied to each expansion component 404 by a corresponding spring element 402 to prevent the expansion component from being dislodged, for example, during transport of the computing device. It will be appreciated that the expansion card components 404 are of equal height once installed, even though the form factors of the expansion cards may vary, as will be described in more detail below. As such, either a single spring element or individual spring elements may be employed to secure all of the expansion card components.

The hinged retainer 401 further includes a connection label 412 on the outside of the hinged retainer that is displayed such that the connection label is viewable when the hinged retainer is closed. For example, the connection label 412 may include connection descriptors for primary circuit board components such as voltage regulator modules or processor sockets. In some examples, the connection label 412 is a double-sided label having additional connection descriptors printed on a side opposite the primary circuit board connection descriptors. For example, the additional connection descriptors may be expansion card/expansion slot descriptors that include location codes for the expansion cards/expansion slots. To that end, the hinged retainer 401 includes one or more label windows 410 on the underside of the hinged retainer, such that the expansion card descriptors are viewable through the one or more label windows when the hinged retainer 401 is open. The expansion card descriptors indicate the slot in which the expansion card is installed and, in some examples, the plug order for the expansion cards. In some examples, the one or more label windows are a transparent plastic portion of the hinged retainer 401. In some variations, the entire hinged retainer 401 is transparent or at least semitransparent. In some examples, there is a label window 410 corresponding to each expansion slot or expansion component. In other examples, there is a single label window 410 to provide a view of expansion card descriptors on the bottom side of the label.

Figure 5B:
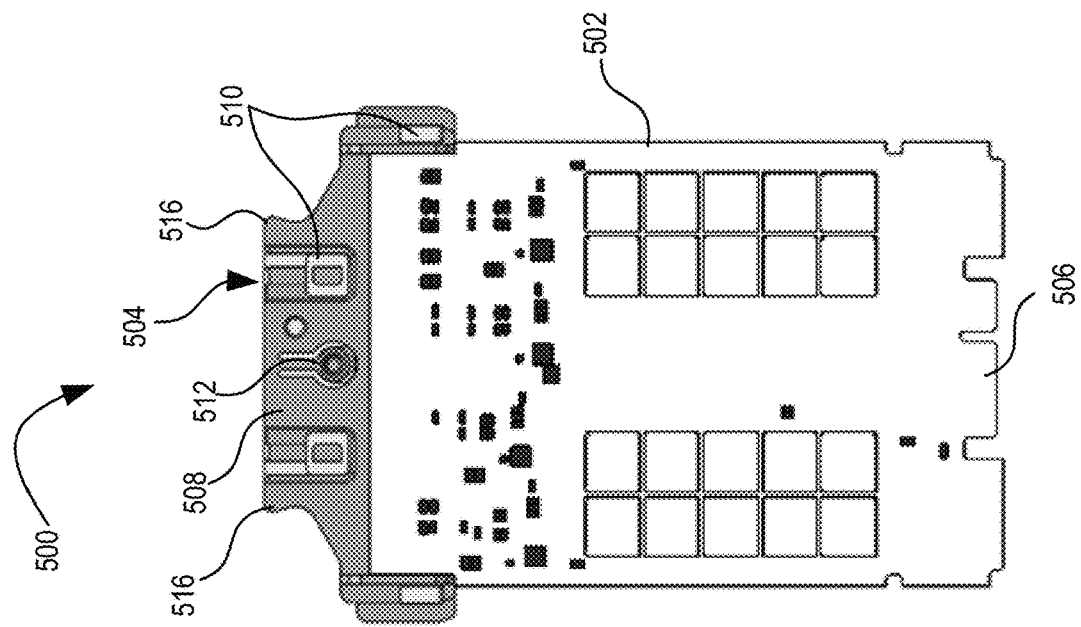
FIG. 5B shows an alternate view of the carrier of FIG. 5A.
Figure 5A:
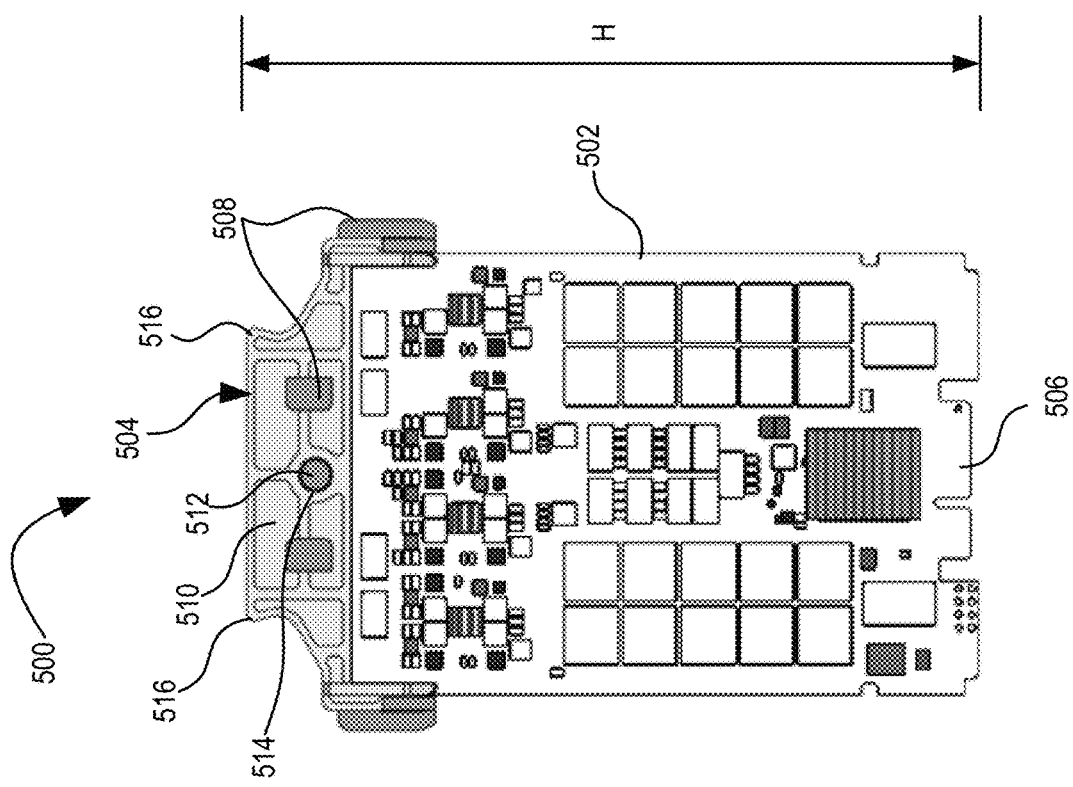
FIG. 5A show an example expansion card carrier of computing system configured for providing optimized housing and serviceability of removable computer system components in accordance with embodiments of the present disclosure for providing optimized housing and serviceability of removable computer system components according to some embodiments of the present disclosure.

For further explanation, FIGS. 5A and 5B sets forth illustrations of an example expansion component 500 for providing optimized housing and serviceability of removable computer system components according to embodiments of the present disclosure. FIG. 5A shows a front view of the example expansion component 500. FIG. 5B shows a rear view of the example expansion component 500. In the example of FIGS. 5A and 5B, the expansion component 500 includes an expansion card 502 (e.g., a DIMM card) and a carrier 504. The expansion card 502 is a double height or 4U expansion card having a standard height dimension. The expansion card 502 includes one or more connectors 506 for insertion into an expansion slot of a primary circuit board. The carrier 504 is removably attached to the expansion card 502 at an end opposite the connectors 506 (i.e., the top of the expansion card). The carrier 504 includes a bottom portion 508 and a top portion 510 that are snapped or clamped together to grip or clamp the expansion card 502. The bottom portion 508 and the top portion 510 are shown in contrast, with the bottom portion 508 darker than the top portion 510. In some examples, the carrier 504 is constructed of an electrostatic dissipating material. The carrier 504 includes grasp points 516 allowing a technician to grasp the expansion component 500 using, for example, a thumb and index finger to grasp the expansion component for extraction. It should be appreciated that the distance between the grasp points 516 is substantially smaller than the width of the expansion card 502, thus facilitating easier grasping when compared to grasping the expansion card 502 without a carrier.

To attach the carrier 504 to the expansion card 502, the expansion card 502 is placed in a pocket of the bottom portion 508 of the carrier 504. The bottom portion 508 of the carrier 504 includes a cantilevered spring coupled to a button 512. With the expansion card 502 placed in the pocket of the bottom portion 508, the top portion 510 of the carrier 504 is slid over the bottom portion 508 until the button 512 snaps into an aperture 514 of the top portion 510 of the carrier 504. Thus, the bottom portion 508 and the top portion 510 of the carrier 504 are fitted together and removably clamped to the expansion card. To remove the carrier 504, the button 512 may be forced from the aperture 514 to release the top portion 510 of the carrier 504 from the bottom portion.

Figure 6C:
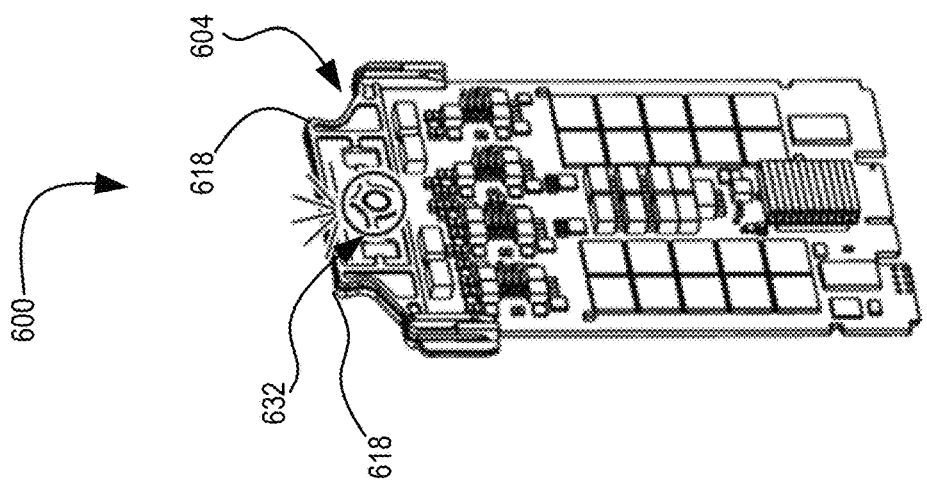
FIG. 6C shows another step of the example assembly process of FIG. 6A.
Figure 6B:
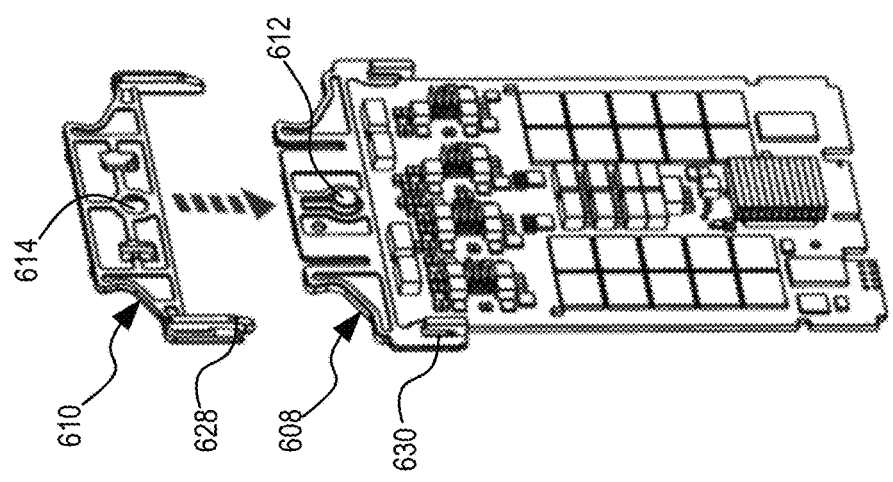
FIG. 6B shows another step of the example assembly process of FIG. 6A.
Figure 6A:
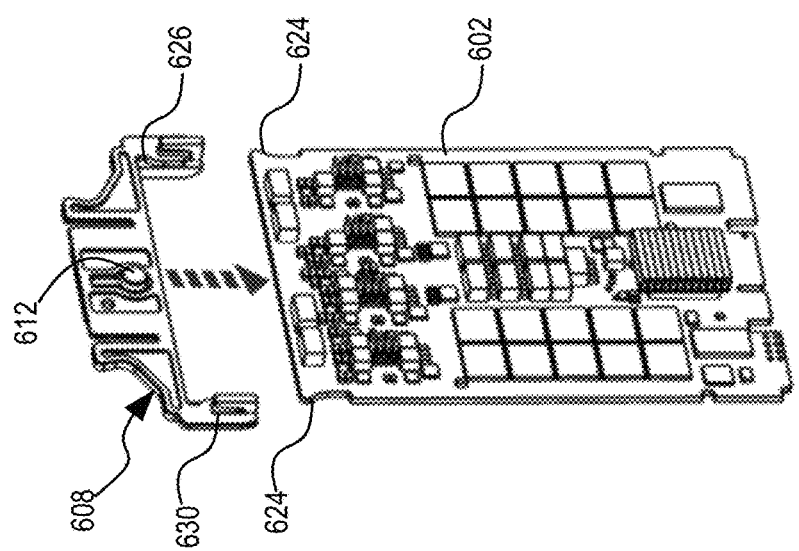
FIG. 6A shows a step of an example assembly process for an example expansion card carrier for providing optimized housing and serviceability of removable computer system components in accordance with embodiments of the present disclosure for providing optimized housing and serviceability of removable computer system components according to some embodiments of the present disclosure.

For further explanation, FIGS. 6A, 6B, and 6C set forth an example assembly of an expansion component 600 for providing optimized housing and serviceability of removable computer system components according to embodiments of the present disclosure. The example expansion component 600 is similar to the example expansion component 500 in FIGS. 5A and 5B. FIG. 6A shows the expansion card 602 and the bottom portion 608 of a carrier 604 before it is coupled to the expansion card 602. The expansion card 602 is a standard double height, or 4U, expansion card such as a DIMM card. The expansion card 602 includes grasp points 624 that create a lip on the top of the expansion card. Effectively, the grasp points 624 are formed by an indentation of the side of the card to facilitate extraction. The bottom portion 608 includes a pocket 626 having a counterpart shape to that of the grasp points 624 and the top edge of the expansion card 602. Thus, the grasp points 624 and top edge of the expansion card 602 are seated in the pocket 626 of the bottom portion 608 of the carrier 604, as shown in FIG. 6B. As also shown in FIG. 6B, the top portion 610 of the carrier 604 is slid onto the bottom portion 608 of the carrier 604. Rails 628 on both sides of the top portion 610 engage tracks 630 on both sides of the bottom portion 608 to guide and retain the top portion 610 as it slides onto the bottom portion 608. As the top portion 608 engages the cantilevered button 612 of the bottom portion 608, the top portion 610 is pushed away from the bottom portion 608 by the button 612 yet retained by the rails 628 that have engaged the tracks 630. Once the top portion 610 has slid completely onto the bottom portion 608 and the button 612 engages the aperture 614 in the top portion 610, the spring-loaded force of the cantilever snaps the button 612 through the aperture 614 thus securing the top portion 610 to the bottom portion 608, as illustrated by the snapping action 632 in FIG. 6C. FIG. 6C further illustrates the grasping points 618 of the carrier 604, which are closer together than the grasping points 624 of the expansion card 602.

Figure 7C:
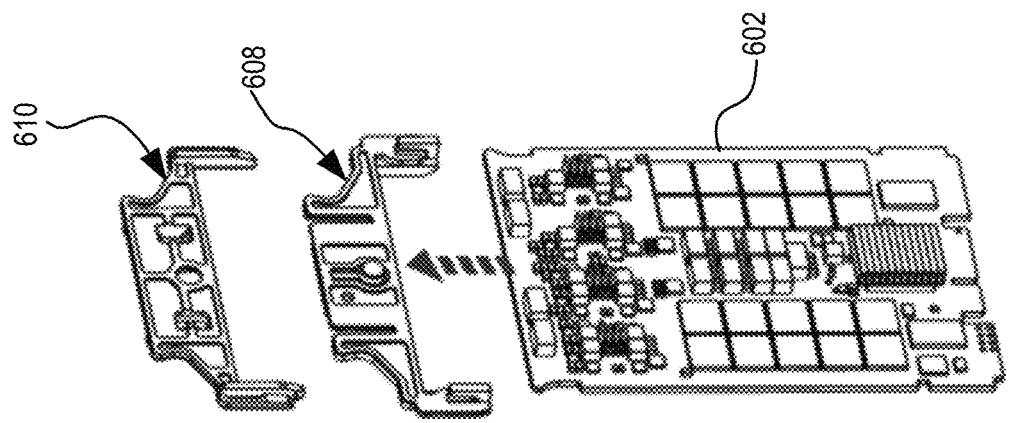
FIG. 7C shows another step of the example assembly process of FIG. 7A.
Figure 7B:
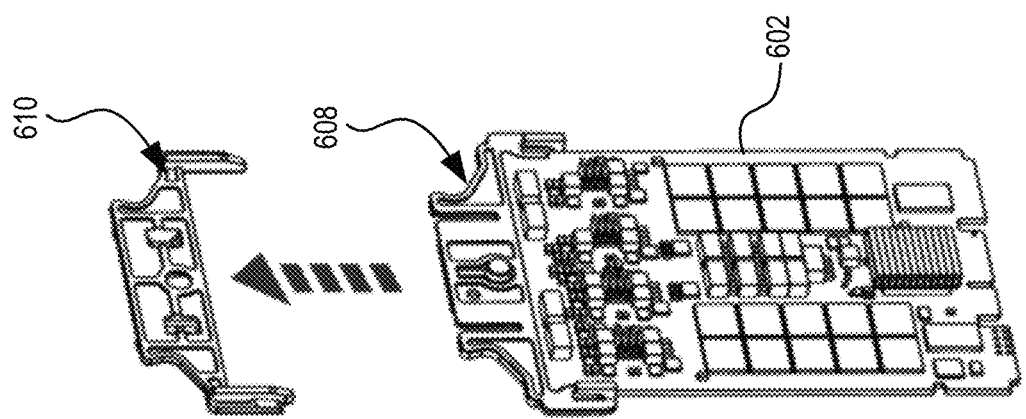
FIG. 7B shows another step of the example assembly process of FIG. 7A.
Figure 7A:
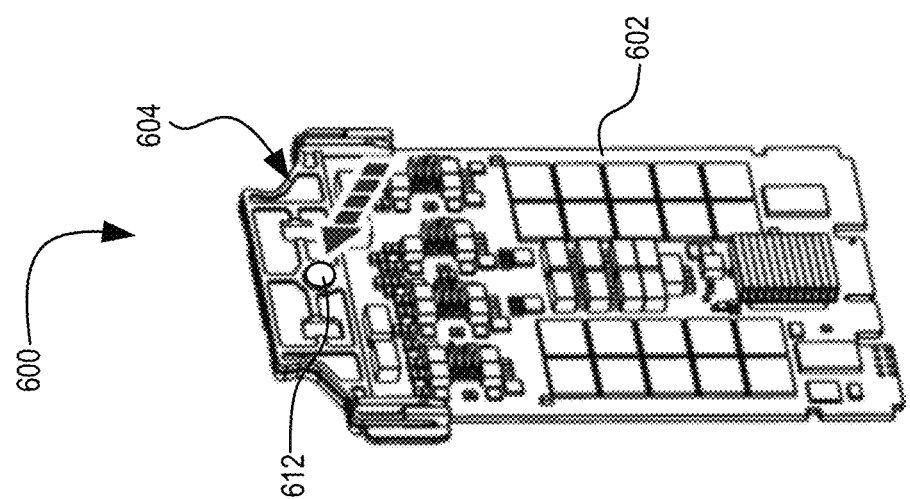
FIG. 7A shows a step of an example disassembly process for an example expansion card carrier for providing optimized housing and serviceability of removable computer system components in accordance with embodiments of the present disclosure for providing optimized housing and serviceability of removable computer system components according to some embodiments of the present disclosure.

For further explanation, FIGS. 7A, 7B, and 7C set forth an example disassembly of the expansion component 600 for providing optimized housing and serviceability of removable computer system components according to embodiments of the present disclosure. In various examples, an expansion card may be swapped with a different expansion card, for example, to replace a faulty expansion card or install an improved expansion card. To facilitate the swapping of expansion cards, carriers are configured for easy removal and reattachment to a different expansion card. After the expansion component 600 is removed from the computing device, the top portion 610 of the carrier 604 is removable from the bottom portion 608 by disengaging the button 612 from the top portion 610, as shown in FIG. 6A. For example, a technician may use fingers or a tool to force the button 612 of the bottom portion 608 to disengage the aperture 614 of the top portion 610. Once the top portion 610 of the carrier has been released from the bottom portion 608, the top portion 610 is slid off the bottom portion 608, as shown in FIG. 7B. Once the top portion 610 of the carrier 604 is removed, the bottom portion 608 of the carrier 604 is separated from the expansion card 602 as shown in FIG. 7C.

In some examples, the expansion card 602 may be removed from the pocket 626 of the bottom portion 608 and replaced with a different expansion card. The expansion component, with the new expansion card, may then be reassembled as shown and described with reference to FIGS. 6A, 6B, and 6C.

Figure 8B:
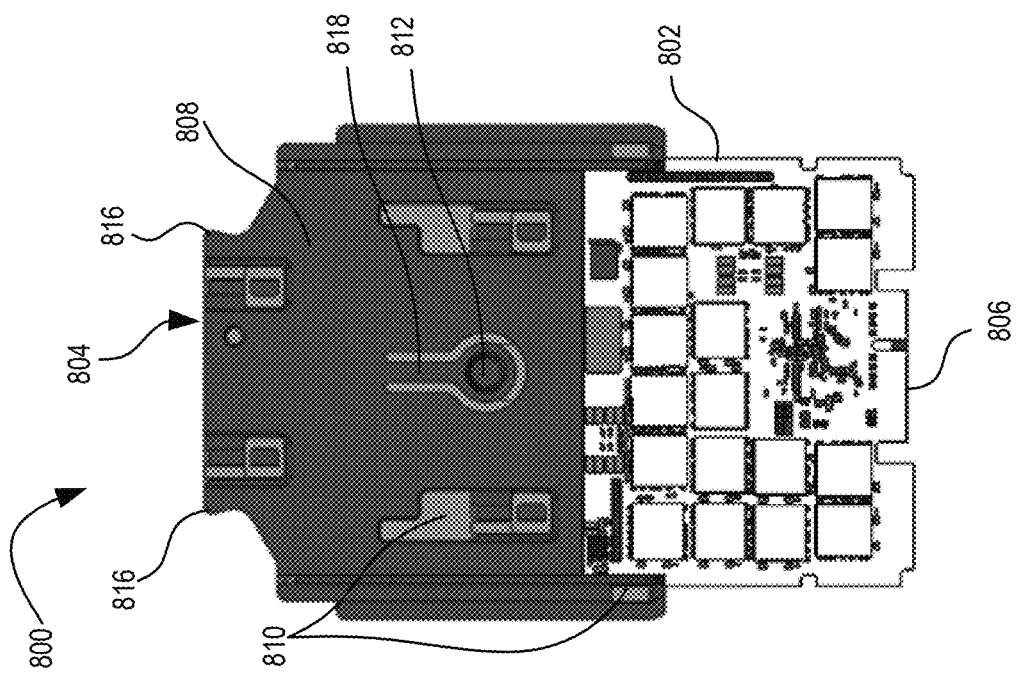
FIG. 8B shows an alternate view of the carrier of FIG. 8A.
Figure 8A:
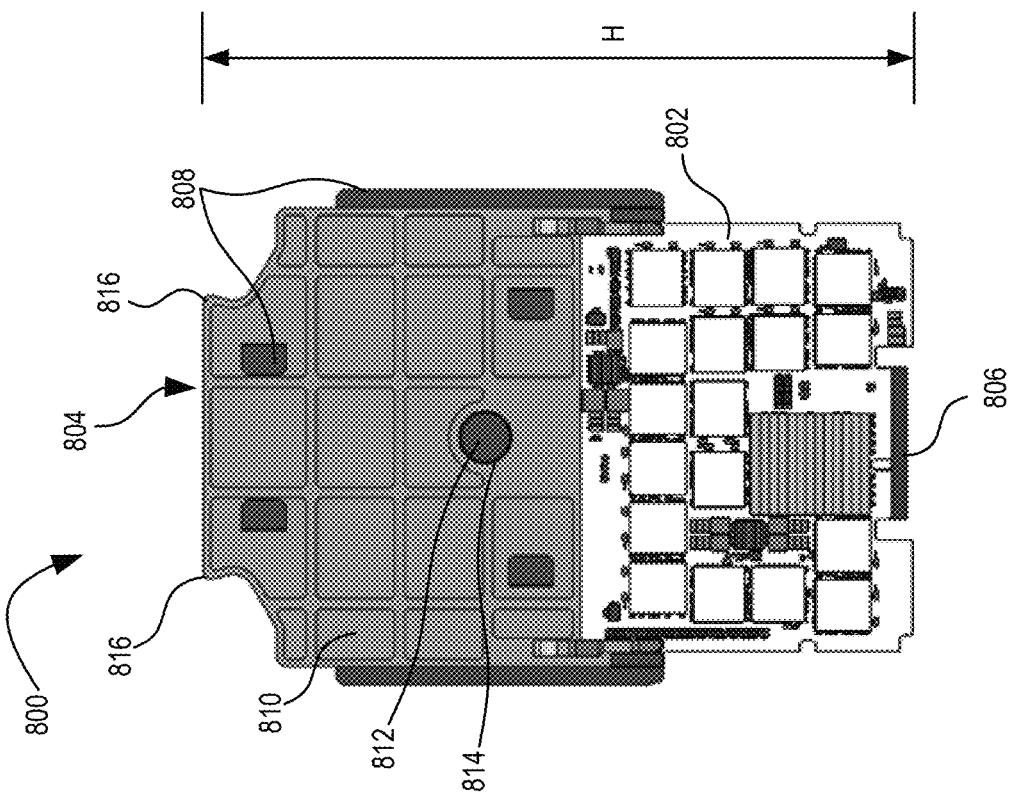
FIG. 8A shows another example expansion card carrier of computing system configured for providing optimized housing and serviceability of removable computer system components in accordance with embodiments of the present disclosure for providing optimized housing and serviceability of removable computer system components according to some embodiments of the present disclosure.

For further explanation, FIGS. 8A and 8B sets forth illustrations of an example expansion component 800 for providing optimized housing and serviceability of removable computer system components according to embodiments of the present disclosure. FIG. 8A shows a front view of the example expansion component 800. FIG. 8B shows a rear view of the example expansion component 800. In the example of FIGS. 8A and 8B, the expansion component includes an expansion card 802 (e.g., a DIMM card) and a carrier 804. The expansion card is a single height or 2U expansion card having a standard height dimension. It will be appreciated that the expansion component 800 of FIGS. 8A and 8B has a height H equal to the height H of the expansion component 500 of FIGS. 5A and 5B having a double height expansion card. In these examples, the carrier 804 compensates for the height difference between a single height, or 2U, expansion card 802 and a double height, or 4U, expansion card 502. Thus, different variations of carriers (e.g., carrier 504 and carrier 804) may be used for different heights of expansion cards such that the expansion components all have an equal height H.

The expansion card 802 includes one or more connectors 806 for insertion into an expansion slot of a primary circuit board. The carrier 804 is removably attached to the expansion card 802 at an end opposite the connectors 806 (i.e., the top of the expansion card). The carrier 804 includes a bottom portion 808 and a top portion 810 that snap together. The bottom portion 808 and the top portion 810 are shown in contrast, with the bottom portion 808 darker than the top portion 810. In some examples, the carrier 804 is constructed of an electrostatic dissipating material. The carrier 804 includes grasp points 816 allowing a technician to grasp the expansion component 800 using, for example, a thumb and index finger to grasp the expansion component for extraction. It should be appreciated that the distance between the grasp points 816 is substantially smaller than the width of the expansion card 802, thus facilitating easier grasping when compared to grasping the expansion card without a carrier.

To attach the carrier 804 to the expansion card 802, the expansion card 802 is placed in a pocket of the bottom portion 808 of the carrier 804. The bottom portion 808 of the carrier 804 includes a cantilever spring 818 coupled to a button 812. With the expansion card 802 placed in the pocket of the bottom portion 808, the top portion 810 of the carrier 804 is slid over the bottom portion 808 until the button 812 snaps into an aperture 814 of the top portion 810 of the carrier 804. Thus, the bottom portion 808 and the top portion 810 of the carrier 804 are fitted together and removably attached to the expansion card. To remove the carrier 804, the button 812 may be forced from the aperture 814 to release the top portion 810 of the carrier 804 from the bottom portion.

Figure 9B:
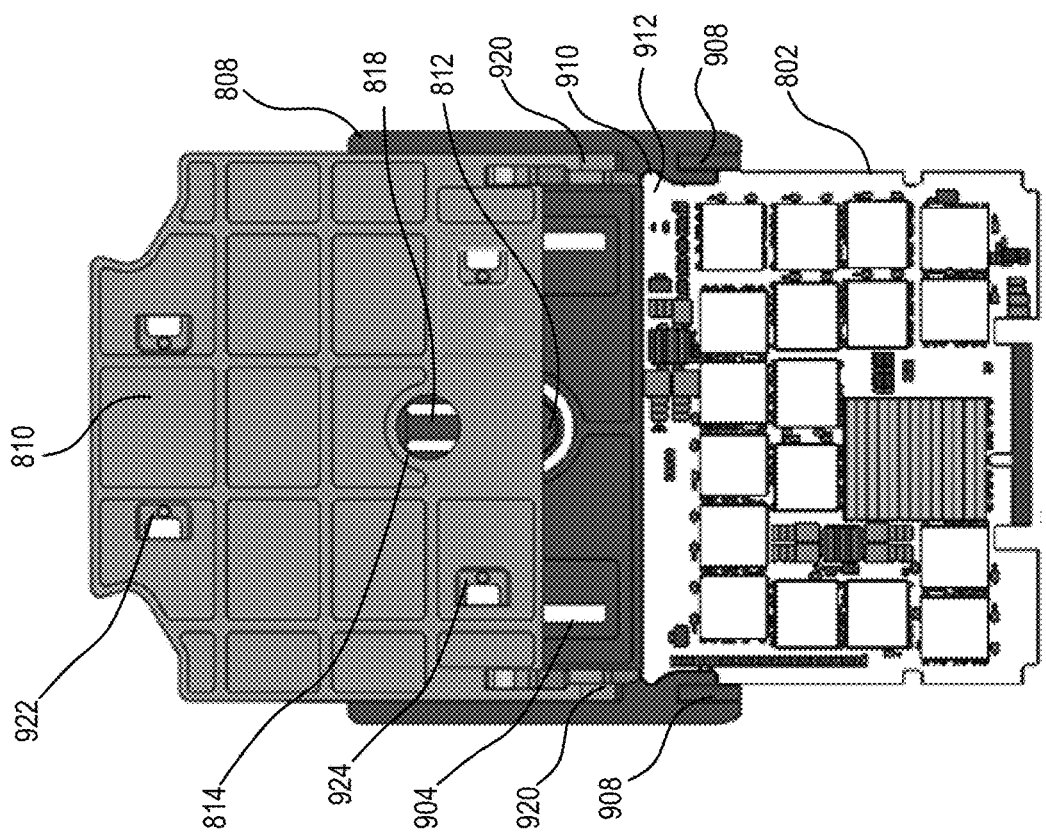
FIG. 9B shows another step of the example assembly process of FIG. 9A.
Figure 9A:
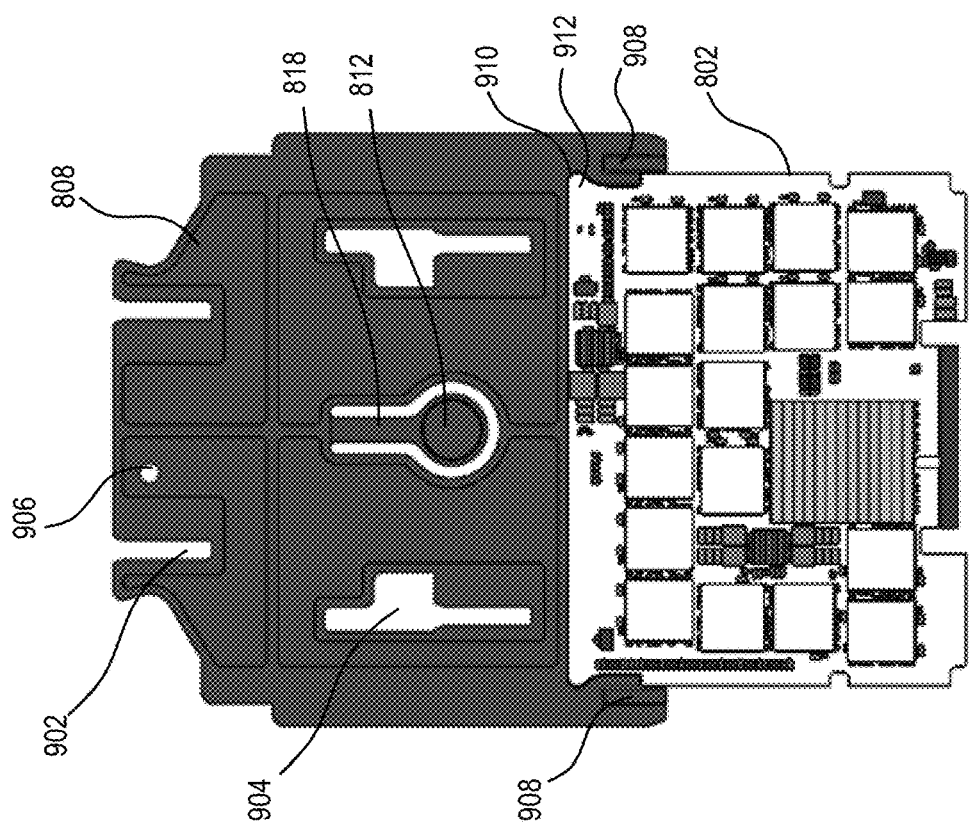
FIG. 9A shows a step of an example assembly process for an example expansion card carrier for providing optimized housing and serviceability of removable computer system components in accordance with embodiments of the present disclosure for providing optimized housing and serviceability of removable computer system components according to some embodiments of the present disclosure.

For further explanation, FIGS. 9A and 9B set forth an example assembly of an expansion component 800 for providing optimized housing and serviceability of removable computer system components according to embodiments of the present disclosure. FIGS. 9A and 9B illustrate an assembly of the expansion component 800 in FIGS. 8A and 8B. Like the assembly process shown in FIGS. 6A, 6B, and 6C, FIG. 9A shows that the expansion card 802 is seated in a pocket 910 of the bottom portion 808 of the carrier 804, where the pocket 910 conforms to the shape of grasp points 912 of the expansion card 802. The bottom portion 808 also includes tracks 908 on both sides of the bottom portion 808 for engaging rails 920 of the top portion 810 of the carrier 804, as well as notches 902, 904 for receiving tabs 922, 924 of the top portion 810 of the carrier 804. FIG. 9A further shows an orientation guide 906 that may be used in conjunction with an assembly frame, which will be explained in greater detail below.

In FIG. 9B, the top portion 810 of the carrier 804 is placed on the bottom portion 808 of the carrier 804 such that the tabs 922, 924 are aligned within the notches 902, 904 and the rails 920 are aligned with the tracks 908. The top portion 810 is then slid downward over the bottom portion 808. In some examples, the button 812 attached to the cantilever spring 818 has a protruding semispherical shape. As the top portion 810 is slid downward over the bottom portion 808, the top portion engages the button 812. A bias force applied by the cantilever spring 818 is transferred to the top portion 810, which is retained in place through the engagement of the tabs 922, 924 and rails 920 with the notches 902, 904 and tracks 908. Once the button 812 sufficiently engages the aperture 814 of the top portion 810, the button 812 is forced through the aperture 814 by application of the spring force, which snaps the bottom portion 808 and the top portion 810 of the carrier together, thus securely attaching the carrier 804 to the expansion card 802. Reference is made to FIGS. 8A and 8B, which shows the carrier 804 attached to the expansion card 802 after the assembly shown in FIGS. 9A and 9B.

Figure 10:
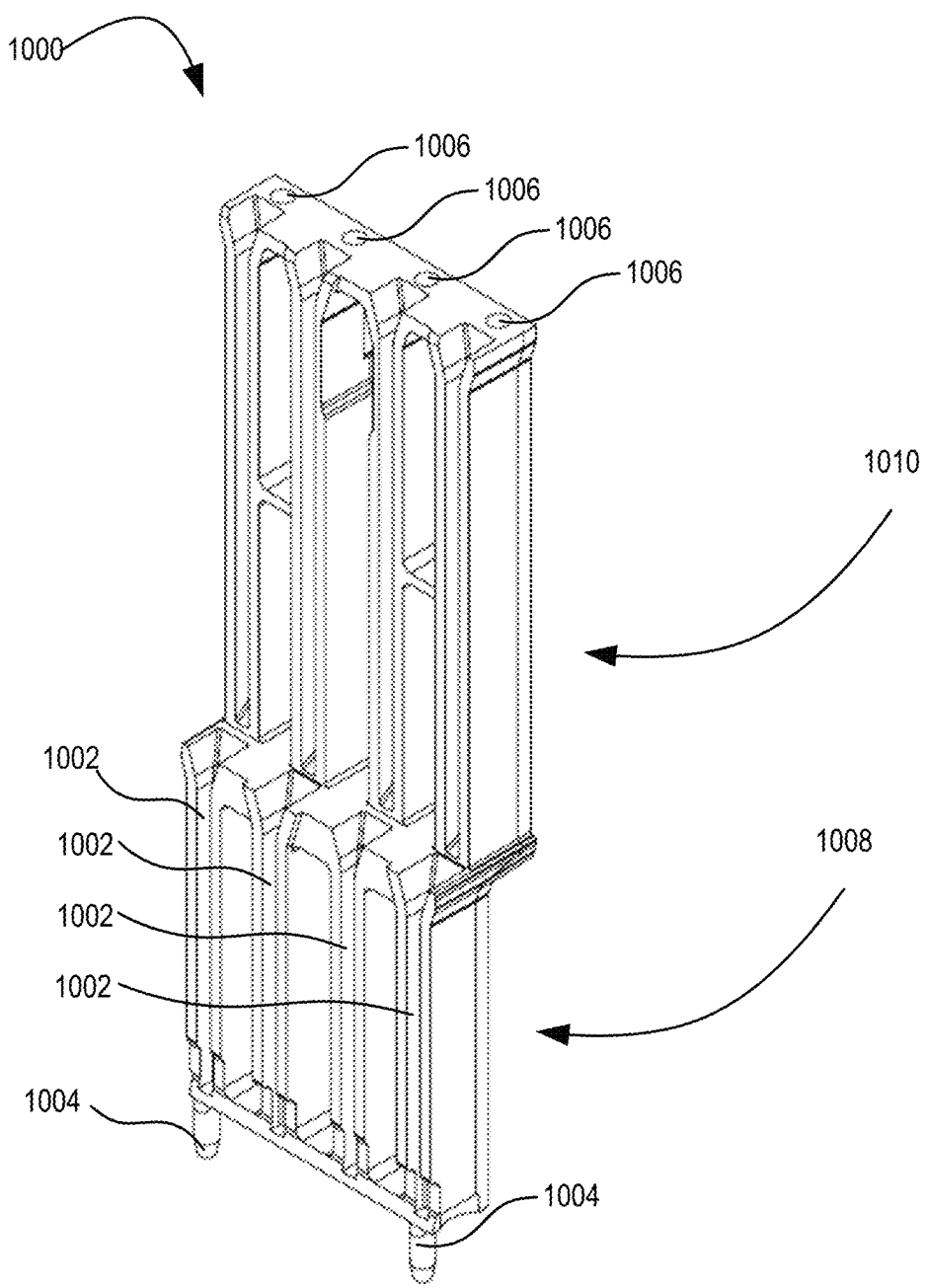
FIG. 10 shows an illustration of example component guide of a computing system configured for providing optimized housing and serviceability of removable computer system components according to some embodiments of the present disclosure.

For further explanation, FIG. 10 sets forth a perspective view of an example guide element 1000 for providing optimized housing and serviceability of removable computer system components according to embodiments of the present disclosure. The guide element 1000 installs onto a wall of the computing device chassis to assist in guide expansion cards into their respective slots on the primary circuit board. In this particular example, the guide element 1000 includes a card guide portion 1008 including four guides 1002 for four expansion cards. In this particular example, the guide element is configured to receive single height, or 2U, expansion cards although a similar arrangement may be utilized for double height, or 4U, expansion cards. Note, in this example, an upper portion 1010 of the guide element 1000 accommodates the carrier attached to the expansion card. The guide element 1000 further comprises a light pipe 1006 corresponding to each expansion card slot to convey light from an indicator light on the primary circuit board. For example, the primary circuit board use different colors of an LED or different lighting patterns (e.g., continuous, blinking) to indicate whether an expansion card is installed, whether an expansion slot is open, whether an expansion card has faulted, and so on. The guide element 1000 further includes alignment pins 1004 that are insertable into the primary circuit board to align the guide element 1000 with the expansion slots on the primary circuit board. In some examples, the guide element 1000 is constructed of electrostatic dissipating material.

Figure 11:
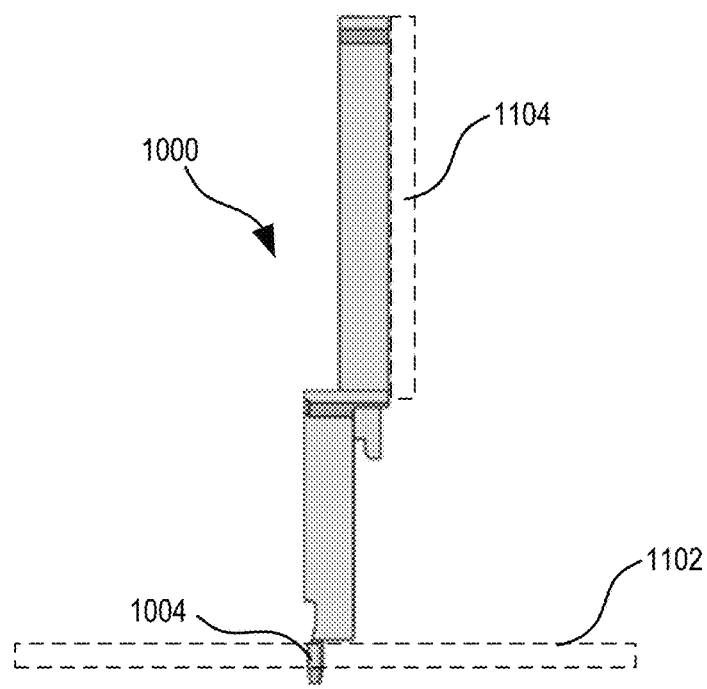
FIG. 11 shows an illustration of example component guide of a computing system configured for providing optimized housing and serviceability of removable computer system components according to some embodiments of the present disclosure.

For further explanation, FIG. 11 sets forth a profile view of the example guide element 1000 of FIG. 10. In FIG. 11, the guide element 1000 is shown coupled to a chassis wall 1104 of the computing device. For example, the guide element 1000 may be affixed to the chassis wall 1104, for example, by snapping into the chassis wall. Alignment pins 1004 are inserted into the primary circuit board 1102 for aligning the card guides with expansion slots on the primary circuit board 1102.

Figure 12:
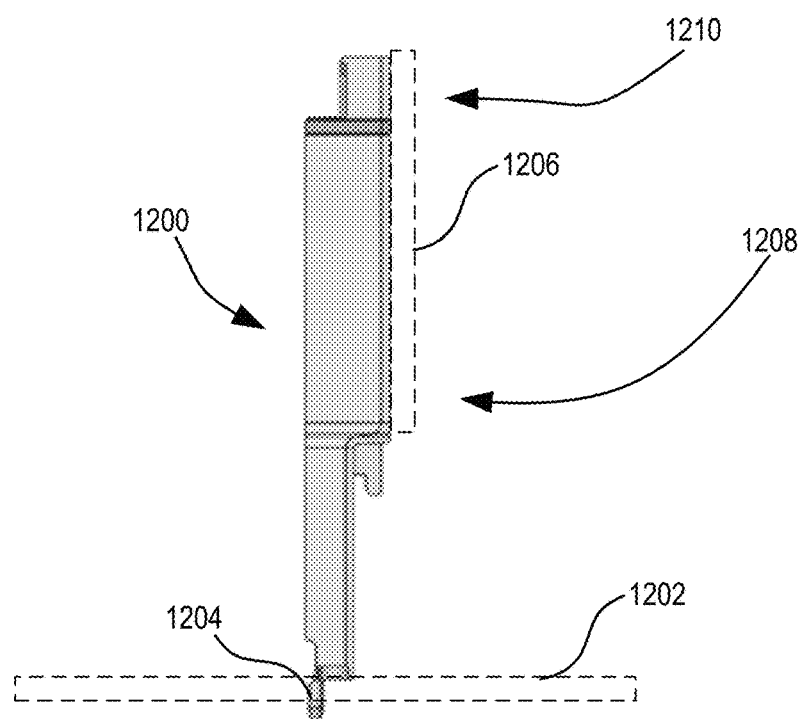
FIG. 12 shows an illustration of example component guide of a computing system configured for providing optimized housing and serviceability of removable computer system components according to some embodiments of the present disclosure.

For further explanation, FIG. 12 sets forth a profile view of another example guide element 1200 for providing optimized housing and serviceability of removable computer system components according to embodiments of the present disclosure. The example guide element 1200 is similar to the guide element 1000 except that the guide element 1200 is configured for a double height expansion card. A lower portion 1208 of the guide element 1200 includes card guides for one or more expansion cards and an upper portion 1210 of the guide element accommodates the carriers of the expansion cards. In FIG. 12, the guide element 1200 is shown coupled to a chassis wall 1206 of the computing device. For example, the guide element 1200 may be affixed to the chassis wall 1206, for example, by snapping into the chassis wall. In some examples, alignment pins 1204 are inserted into the primary circuit board 1202 for aligning the card guides with expansion slots on the primary circuit board 1102.

Figure 13:
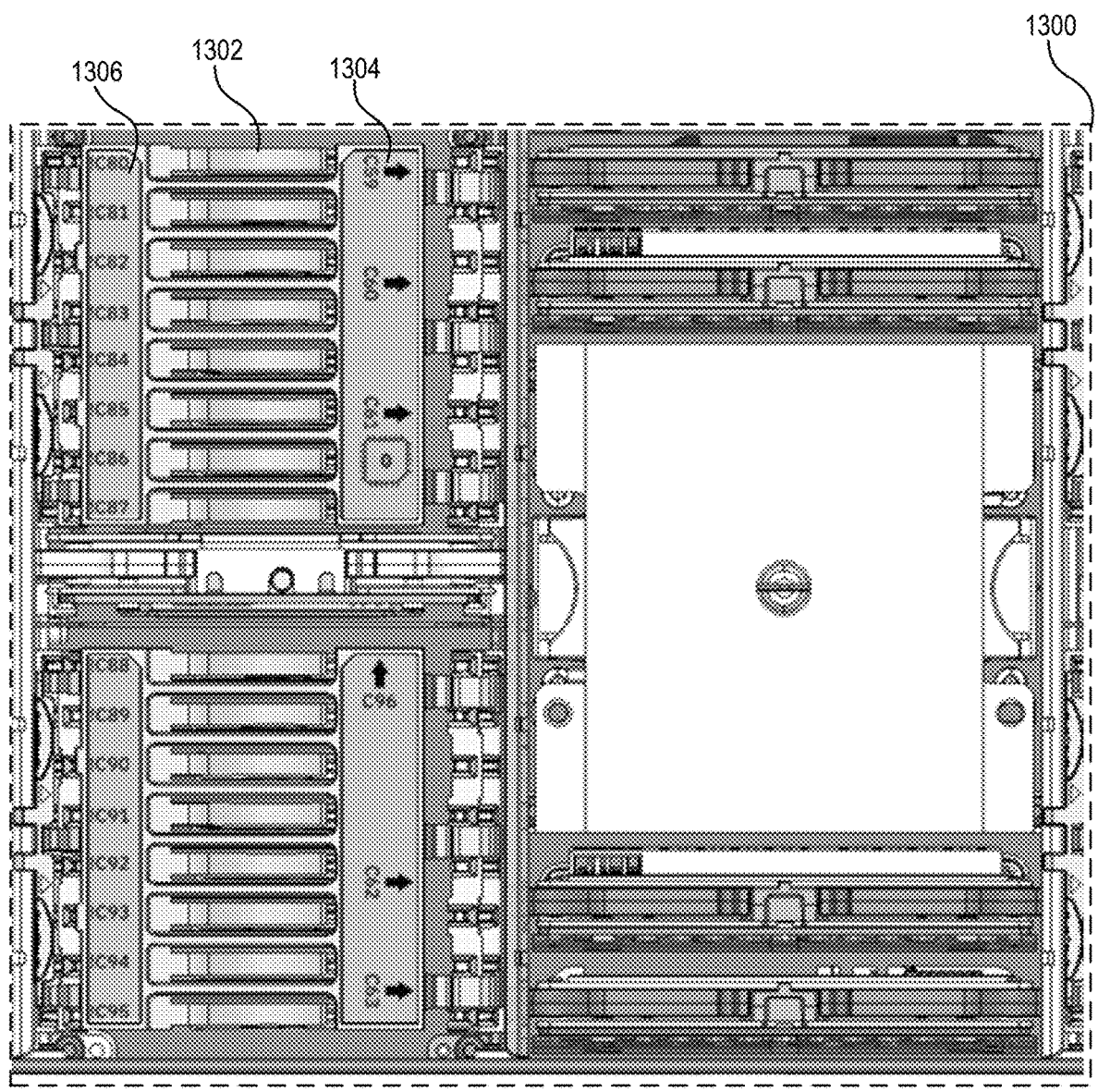
FIG. 13 shows an illustration of an overhead view of an example computing system configured for providing optimized housing and serviceability of removable computer system components according to some embodiments of the present disclosure.

For further explanation, FIG. 13 sets forth an overhead view of a portion of an example computing device 1300 for providing optimized housing and serviceability of removable computer system components according to embodiments of the present disclosure. The example computing device 1300 may be similar to the example computing device 200 of FIG. 2. The example computing device 1300 includes one or more hinged retainers 1302 such as those discussed above. The hinged retainer 1302 includes a first label 1304 on the top surface of the hinged retainer, as shown in FIG. 13, that includes descriptors for location or orientation of primary circuit board components such as processor sockets, voltage regulator modules, and so on. In some examples, the first label 1304 is a double-sided label that includes information printed on the underside of the label. The information on the underside of the first label 1304 includes descriptors for expansion card/expansion slot locations. In these examples, the first label 1304 is placed over a transparent portion of the hinged retainer 1302 such that, when the hinged retainer is opened for servicing the expansion components, the descriptors for expansion card/expansion slot locations on the underside of the first label 1304 are viewable through the underside of the hinged retainer 1302. For example, the descriptors for expansion card/expansion slot locations are viewable through the one or more windows 410 described above with reference to FIG. 4. In some examples, the hinged retainer 1302 includes a second label 1306 on the top surface of the hinged retainer, as shown in FIG. 13, that includes descriptors for the expansion card/expansion slot locations that is viewable when the hinged retainer 1302 is closed.

Figure 14A:
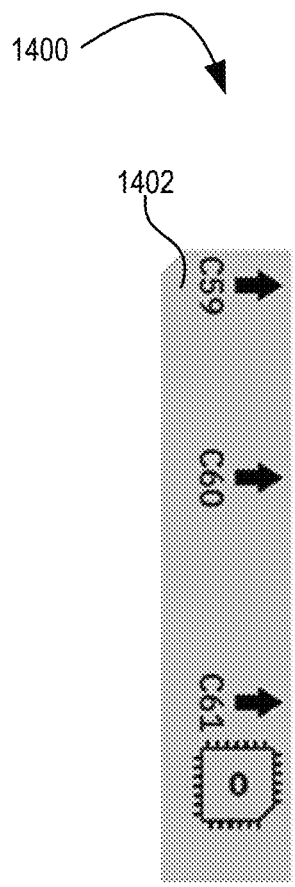
FIG. 14A shows a first side of an example double-sided label for providing optimized housing and serviceability of removable computer system components according to some embodiments of the present disclosure.
Figure 14B:
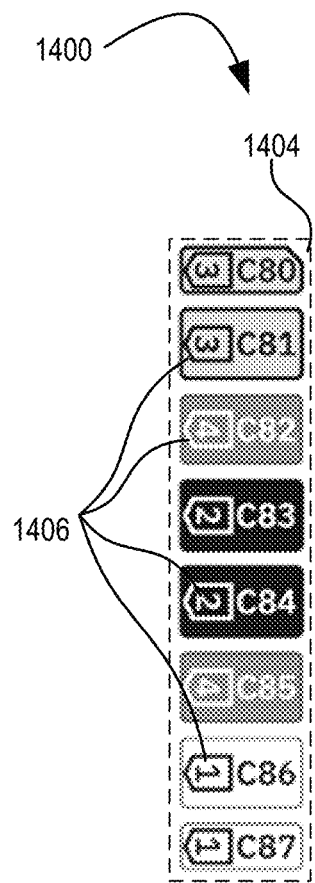
FIG. 14B shows a first side of the example double-sided label of FIG. 14A.

For further explanation, FIGS. 14A and 14B set forth an example double-sided label 1400 for providing optimized housing and serviceability of removable computer system components according to embodiments of the present disclosure. FIG. 14A shows the top side 1402 of the double-sided label 1400 that includes descriptors (e.g., location codes) for locations of primary circuit board components such as processor sockets, voltage regulator modules, and so on. For example, the top side 1402 of the double-sided label 1400 corresponds to the viewable side of first label 1304 in FIG. 13. FIG. 14B shows the bottom side 1404 of the double-sided label 1400 that includes descriptors (e.g., location codes) for expansion card/expansion slot locations. In some examples, as shown in FIG. 14B, the bottom side 1404 also includes indicators 1406 of plug order for the expansion slots.

Figure 15:
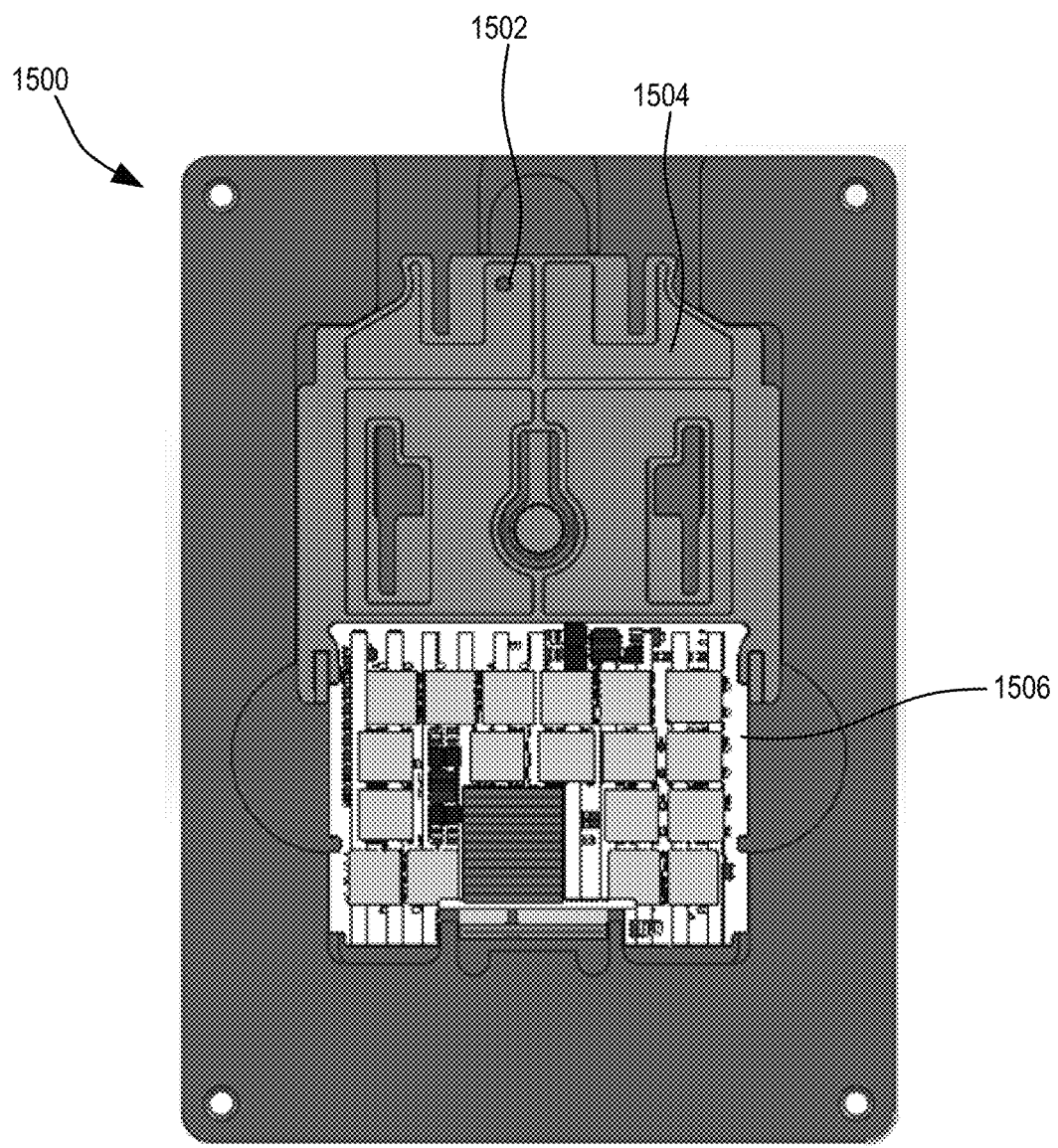
FIG. 15 shows an illustration of an example assembly mechanism for providing optimized housing and serviceability of removable computer system components according to some embodiments of the present disclosure.

For further explanation, FIG. 15 sets forth an example carrier attachment mechanism 1500 for providing optimized housing and serviceability of removable computer system components according to embodiments of the present disclosure. The carrier attachment mechanism 1500 is useful for assembling the carrier on the expansion card. The carrier attachment mechanism 1500 includes an orientation pin 1502 that fits to an orientation guide (e.g., the orientation guide 906 of FIG. 9A) of the bottom portion 1504 of a carrier. The bottom portion of the carrier is placed onto carrier attachment mechanism 1500 using the orientation pin 1502 as a guide. The expansion card 1506 is then seated in the bottom portion 1504 of the carrier. The carrier attachment mechanism 1500 retains the bottom portion 1504 of the carrier and the expansion card 1506 in place to facilitate attachment of the top portion of the carrier.

Figure 16:
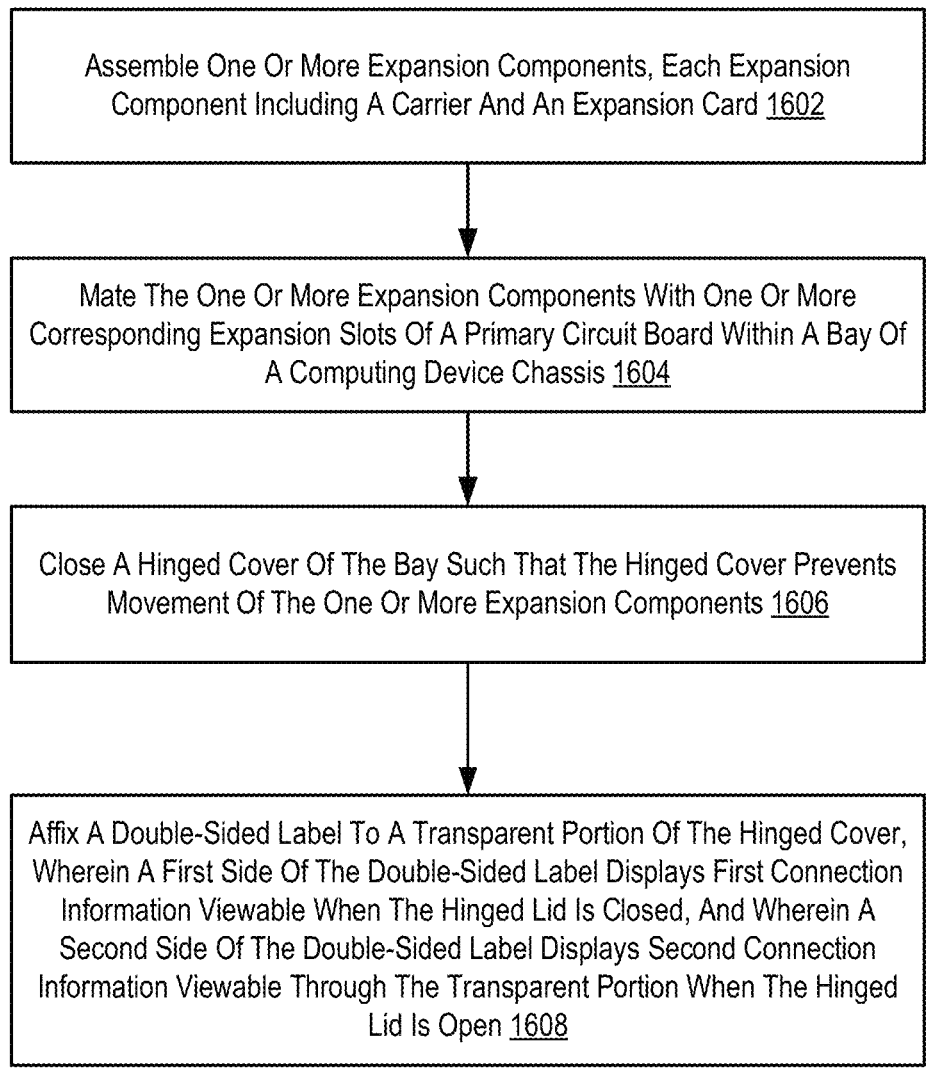
FIG. 16 is a flowchart of an example method for providing optimized housing and serviceability of removable computer system components according to some embodiments of the present disclosure.

For further explanation, FIG. 16 sets forth a flow chart of an example method for providing optimized housing and serviceability of removable computer system components according to embodiments of the present disclosure. The method of FIG. 16 includes assembling 1602 one or more expansion components, each expansion component including a carrier and an expansion card. In some examples, assembling 1602 the expansion components is carried out by attaching a carrier to an expansion card as discussed above and shown in FIGS. 6A, 6B, 6C, 9A, and 9B. The method of FIG. 16 also includes mating 1604 the one or more expansion components with one or more corresponding expansion slots of a primary circuit board within a bay of a computing device chassis. In some examples, the expansion components are mated 1604 with expansion slots by inserting each expansion component into a guide element within the bay until a connector of the expansion card securely mates with an expansion slot of the primary circuit board, as discussed above and shown in FIGS. 3 and 4. The method of FIG. 16 also includes closing 1606 a hinged cover of the bay such that the hinged cover prevents movement of the one or more expansion components. In some examples, closing 1606 the hinged cover is carried out as discussed above and shown in FIG. 4, wherein deformable retention elements apply a force to the expansion components when the hinged cover is closed. The method of FIG. 16 also includes affixing 1608 a double-sided label to a transparent portion of the hinged cover, wherein a first side of the double-sided label displays first connection information viewable when the hinged lid is closed, and wherein a second side of the double-sided label displays second connection information viewable through the transparent portion when the hinged lid is open. In some examples, affixing 1608 the double-sided label is carried out as discussed above and shown in FIGS. 4, 13, 14A, and 14B.

Figure 17:
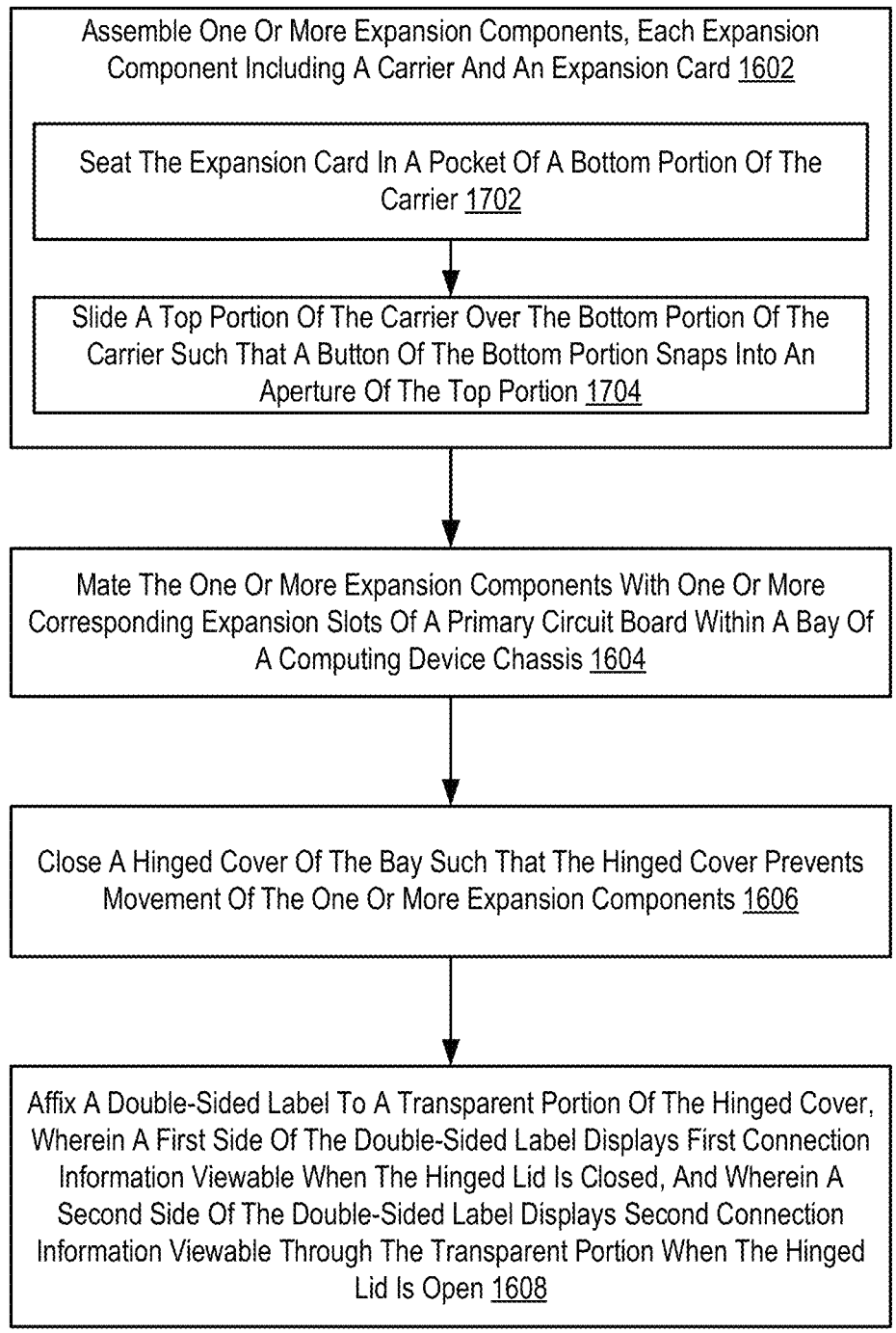
FIG. 17 is a flowchart of an example method for providing optimized housing and serviceability of removable computer system components according to some embodiments of the present disclosure.

For further explanation, FIG. 17 sets forth a flow chart of an example method for providing optimized housing and serviceability of removable computer system components according to embodiments of the present disclosure. The method of FIG. 17 continues the method of FIG. 16 in that, as part of assembling 1602 the expansion components, the method of FIG. 17 includes seating 1702 the expansion card in a pocket of a bottom portion of the carrier. In some examples, seating 1702 the expansion card is carried out as discussed above and shown in FIGS. 6A and 9A. Further, as part of assembling 1602 the expansion components, the method of FIG. 17 also includes sliding 1704 a top portion of the carrier over the bottom portion of the carrier such that a button of the bottom portion snaps into an aperture of the top portion. In some examples, sliding 1704 the top portion of the carrier over the bottom portion is carried out as discussed above and shown in FIGS. 6B, 6C, and 9B.

In view of the explanations set forth above, readers will recognize that the benefits of providing optimized housing and serviceability of removable computer system components according to embodiments of the present disclosure include:

Easier grasping of removable components, such as DIMMs, in high density arrangements by providing a component carrier.

Accommodation of different form factors of removable components using different types of carriers.

Enhanced retention of the removable components during transport through a hinged retention cover.

Increased visibility of status indicator lights for identifying a component to be serviced by providing light pipes in mating guide elements.

Improved labeling to identify removable components locations and to guide technicians with plugging rules for installing or servicing the removable components.

Exemplary embodiments of the present disclosure are described largely in the context of a fully functional computer system for optimizing network load in multicast communications. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A computing device comprising:
   a chassis including a bay having a hinged cover,
   a primary circuit board secured to the chassis, the primary circuit board including a plurality of expansion slots accessible through the bay of the chassis, and
   a plurality of expansion components removably coupled to the primary circuit board via the plurality of expansion slots, wherein each expansion component includes:
      an expansion card configured for mating with one of the expansion slots,
      a carrier removably attached to the expansion card such that the carrier provides a grip for inserting and extracting the expansion card, wherein the carrier includes a bottom portion configured to receive the expansion card and a top portion configured to snap to the bottom portion by sliding over the bottom portion, and
      a plurality of component guides within the bay, wherein each component guide is configured to guide mating of each expansion card with the corresponding expansion slot.

2. The computing device of claim 1, wherein the hinged cover includes one or more deformable retention elements that apply a force to the plurality of expansion components when the hinged cover is closed.

3. The computing device of claim 2, wherein the hinged cover includes a first label area on an exterior surface of the hinged cover, the first label area including a transparent portion to which a double-sided label is attached, wherein a first side of the double-sided label displays first connection information Viewable when the hinged cover is closed, and wherein a second side of the double-sided label displays second connection information Viewable through the transparent portion when the hinged cover is open.

4. The computing deVice of claim 3, wherein the first connection information includes location code information for one or more primary circuit board components.

5. The computing deVice of claim 3, wherein the second connection information includes at least one of location code information and plug order for each expansion card.

6. The computing deVice of claim 3, wherein the hinged cover includes a second label on the exterior surface of the hinged cover, the second label including at least one of location code information and plug order for each expansion card.

7. The computing device of claim 1, wherein the bottom portion includes a pocket for receiving an end of the expansion card.

8. The computing deVice of claim 7, wherein the expansion card includes one or more grasp points, and wherein the pocket conforms to a shape of the one or more grasp points.

9. The computing device of claim 1, wherein a first type of carrier is attached to at least one single height expansion card, wherein a second type of carrier is attached to at least one double height expansion card, and wherein the first type of carrier compensates for the height of the at least one single height expansion card such that all of the expansion components are of equal height.

10. The computing device of claim 1, wherein each removable expansion component of the plurality of expansion components is swappable, such that, after removal of a first expansion component of the plurality of expansion components from a first expansion slot of the plurality of expansion slots, a first carrier of the first expansion component is removable from a first expansion card and attachable to a second expansion card prior to insertion of the second expansion card into the first expansion slot.

11. The computing device of claim 1, wherein each component guide includes a light pipe that conveys light from an indicator lamp on the primary circuit board.

12. The computing device of claim 1, wherein the expansion card includes a dual inline memory module.

13. The computing device of claim 1, wherein the plurality of expansion slots includes a pitch of 11 millimeters or less.

14. An expansion card carrier comprising:
a bottom portion including a pocket for receiving an end of an expansion card; and a top portion configured to snap fit to the bottom portion, wherein the top portion is snapped to the bottom portion by sliding the top portion over the bottom portion.

15. The expansion card carrier of claim 14, wherein the end of the expansion card includes one or more grasp points, and wherein the pocket of the bottom portion conforms to a shape of the one or more grasp points.

16. The expansion card carrier of claim 14, wherein the expansion card has a height that is shorter than a form factor height, and wherein the carrier compensates the height of the expansion card.

17. The expansion card carrier of claim 14, wherein the expansion card includes a dual inline memory module.

18. A method comprising:
assembling one or more expansion components, each expansion component including a carrier and an expansion card;
mating the one or more expansion components with one or more corresponding expansion slots of a primary circuit board within a bay of a computing device chassis;
closing a hinged cover of the bay such that the hinged cover prevents movement of the 0116 or more expansion components; and
affixing a double-sided label to a transparent portion of the hinged cover, wherein a first side of the double-sided label displays first connection information viewable when the hinged cover is closed, and wherein a second side of the double-sided label displays second connection information viewable through the transparent portion when the hinged cover is open.

19. The method of claim 18, wherein assembling the one or more expansion components includes:
seating the expansion card in a pocket of a bottom portion of the carrier; and
sliding a top portion of the carrier over the bottom portion of the carrier such that a button of the bottom portion snaps into an aperture of the top portion.

20. The method of claim 19 further comprising:
removing a first expansion component of the plurality of expansion components including a first carrier and a first expansion card;
removing the first carrier from the first expansion card;
attaching the first carrier to a second expansion card; and
reinstalling the first expansion component including the first carrier and the second expansion card.

* * * * *